(12) United States Patent
Snow et al.

(10) Patent No.: US 6,546,434 B1
(45) Date of Patent: Apr. 8, 2003

(54) VIRTUAL DEVICE DRIVER (75) Inventors: Kevin D. Snow, Petersburg, MI (US); Susan X. Wang, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/290,095

(22) Filed: Apr. 12, 1999

(51) Int. Cl.[7] .................................................. G06F 9/54
(52) U.S. Cl. ......................... 709/324; 702/89; 710/58; 710/176
(58) Field of Search ................................. 709/321–327, 709/230–237; 710/58–61; 702/89, 177, 178, 187

(56) References Cited

U.S. PATENT DOCUMENTS

| | | | | |
|---|---|---|---|---|
| 4,937,780 A | * | 6/1990 | Geyer et al. | 713/502 |
| 5,815,678 A | | 9/1998 | Hoffman et al. | 710/305 |
| 5,828,881 A | * | 10/1998 | Wang | 709/314 |
| 6,016,466 A | * | 1/2000 | Guinther et al. | 702/187 |
| 6,078,873 A | * | 6/2000 | Shutty et al. | 702/89 |
| 6,321,148 B1 | * | 11/2001 | Leung | 701/29 |
| 6,381,656 B1 | * | 4/2002 | Shankman | 710/18 |

FOREIGN PATENT DOCUMENTS

| | | | |
|---|---|---|---|
| EP | 0 717 548 A2 | 12/1995 | .......... H04M/11/06 |
| WO | WO 98/43401 | 2/1998 | |
| WO | WO 98/44425 | 3/1998 | ........... G06F/13/10 |

OTHER PUBLICATIONS (no author given), "AMD K86 Family BIOS and Software Tools Developers Guide", Advanced Micro Devices, Inc., pp. 72, 73, 81, 96, Jun. 1997.*
European Search Report, 2 pages.
SAE document Serial Data Communications Between Microcomputer Systems in Heavy–Duty Vehicle Applications.
SAE document Joint SAE/TMC Electronic Data Interchange Between Microcomputer Systems in Heavy–Duty Vehicle Applications.

* cited by examiner

Primary Examiner—St. John Courtenay, III
(74) Attorney, Agent, or Firm—Rader, Fishman & Grauer PLLC (57) ABSTRACT

A virtual device driver for processing serial communications in a protected operating system. The virtual device driver adds a time-stamp to each character received at Ring-zero level of the operating system architecture. The time-stamp value is compared to a predetermined maximum acceptable time interval to determine if a valid packet was received.

16 Claims, 6 Drawing Sheets

VIRTUAL DEVICE DRIVER

FIELD OF THE INVENTION

The present invention relates generally to serial communications in a protected operating system. More particularly, the invention relates to a Windows® type operating system-based serial communications driver that time stamps each character of data received at the most privileged architectural level (Ring-zero).

BACKGROUND OF THE INVENTION

A virtual device is an executable that manages a system resource, such as a hardware device or installed software, so that more than one application can use the resource at the same time. A family of operating systems sold under the tradename Windows® by Microsoft Corporation including Windows 95/98/NT/2000 uses virtual devices to allow multitasking for applications running under the operating system. The virtual devices work in conjunction with the operating system to process interrupts and carry out I/O operations for a given application without disrupting the execution of other applications. The virtual devices require virtual device drivers (VxDs). Virtual device drivers enable the operating system to present applications with an abstract interface to the hardware. By providing a standardized way of interacting with a device, the operating system shields the application programmer from the low-level hardware details. This makes application development easier, which leads to more successful applications and a more successful operating system platform.

Under the Windows® operating system, for example, VxDs are responsible for implementing an environment in which application code can successfully interact with the PC hardware. To allow users of the Windows® operating system to run multiple applications simultaneously, the system's designers implemented virtual machines. A virtual machine is a separate environment in which an application runs. It has its own address space, register state, stacks, local descriptor table, interrupt table state, and execution priority.

Figure 1:
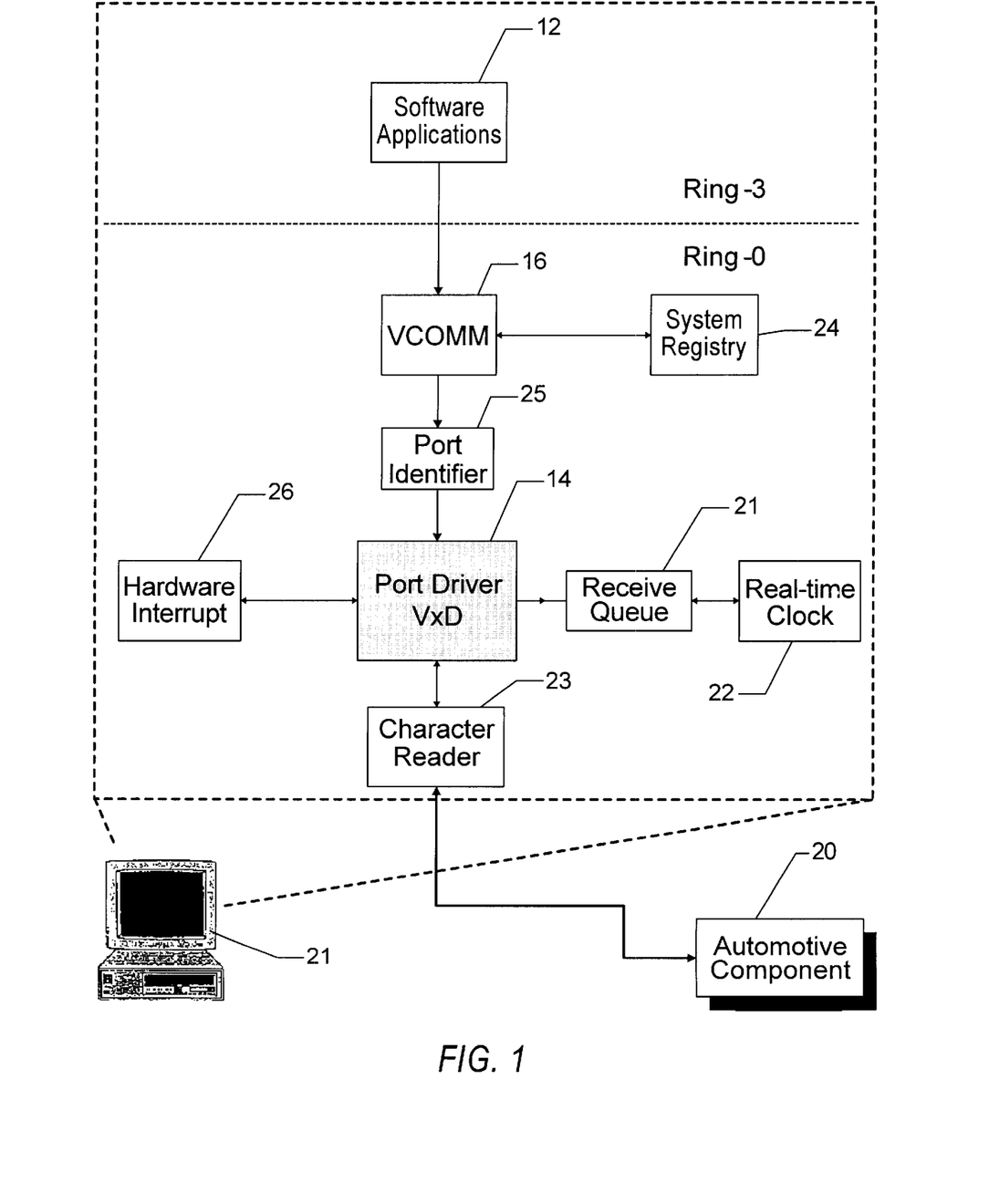
FIG. 1 is a diagrammatic block view of a protected operating system architecture.

Now referring to FIG. 1, a generalized diagram of a protected operating system 10 architecture, such as the Windows® operating system, is illustrated therein. Modern microprocessors have distinct modes of operation for execution of trusted system code and the execution of application code. Protected operating system 10 is structured in layers. Software applications 12 run at Ring-3, and Rings 1 and 2 are typically not used. Windows® components referred to as Device Drivers (those having the extension. DRV—not shown) are different from virtual device drivers, VxDs, such as the port driver VxD 14; Device Drivers are 16-bit components that run at Ring-3.

VxDs are loaded as part of the Virtual Machine Manager (VMM—not shown) and constitute the lowest level (Ring-0) of the protected operating system 10. The VMM (not shown) is a special VxD that plays an executive role in coordinating use of system resources. The primary job of the VMM is to create, schedule, and destroy virtual machines. In addition, it provides the services that enable other VxDs to intervene between software applications 12 and hardware, such as automotive component 20.

DOS applications, originally written for a single program environment, often attempt to directly access sensitive hardware resources, such as interrupt controllers and DMA controllers. To run multiple such applications, along with software applications 12, the protected operating system 10 must implement instances of virtual devices for each virtual machine. The task of a VxD is to manage a virtual device state for each client virtual machine that needs access to the corresponding physical device. VxDs collectively provide virtual machine environments for client applications by transparently arbitrating access to the underlying physical layer (Ring-0). This is referred to as virtualization.

Although VxDs were originally designed with the purpose of virtualization in mind, their usage has evolved to encompass additional features. Increasingly, system designers choose VxDs for maximum performance and fine control. For example, to support a device that requires low interrupt latency, a VxD is often essential. In many cases, designers handle all the actual hardware interaction in a VxD, and the VxD presents a simplified application programming interface (API) to applications.

The Virtual Communications Driver (VCOMM) 16 is the centerpiece of the current Windows® architecture for serial and parallel communications. FIG. 1 also shows the interrelationships between VCOMM 16 and other components in protected operating system 10 for a software application 12. An application program interface (API) is the interface (calling conventions) by which an application program accesses the operating system and other services. An API is defined at the source code level (Ring-0) and provides a level of abstraction between the application and the kernel (or privileged utilities) to ensure the code portability. VCOMM 16 services serial I/O requests from software applications 12 and VxD callers of its service entry points by calling a port driver VxD 14 such as serial.vxd in the Windows® operating system.

Many applications require a specific timing accuracy when communicating via the serial communications port. For example, in the automotive industry, computers 18 are often connected to an automotive component 20 to monitor its operating status. To adequately monitor status changes in the automotive component, a certain timing resolution is necessary. For example, the Society of Automotive Engineers (SAE) has defined SAE J1708 and J1587 standards requiring a timing resolution accurate to 1 millisecond ($10^{-3}$ seconds) to detect a complete packet on the serial communications bus.

The timing resolution provided by the Windows® operating system is about 55 milliseconds. Therefore, to detect the actual time each character is received in the internal buffer provided by the serial communications driver, a high accuracy time-stamp must be attached to each character received at Ring-0 level. Microsoft Network supplies serial.vxd as one of the standard Windows® operating system components, but this serial port driver does not provide a time-stamp for each character received. Therefore, a real-time virtual serial device driver must be developed for this purpose.

SUMMARY OF THE INVENTION

The present invention is a real-time virtual serial device driver that adds a time-stamp to each character received at the ring-zero level by utilizing a real-time clock. Specifically, the invention uses the VTD-Get-Real-Time service provided by the Virtual Timer Driver (VTD), thus achieving timing accuracy within microseconds.

The protected operating system includes a system registry which is a single place for keeping such information as what hardware is attached, what system options have been selected, how computer memory is set up and what application programs are to be present when the operating system is started. The present invention reads configuration settings from the system registry upon the port driver VxD being loaded. All the serial communications ports can share the port driver VxD. The J1587 network is a serial communications network that adheres to the communications standards—J1587 and J1708 standards (described more fully below)—proscribed by the SAE. However, a time-stamp should only be attached to the characters received by the serial communications port to which the J1587 network is attached. To enable other ports to function normally, an indication from outside of the port driver VxD is needed to signal the port driver VxD to time-stamp the characters received. Using a time-stamp flag defined in the system registry 24 accomplishes this requirement.

Figure 4:
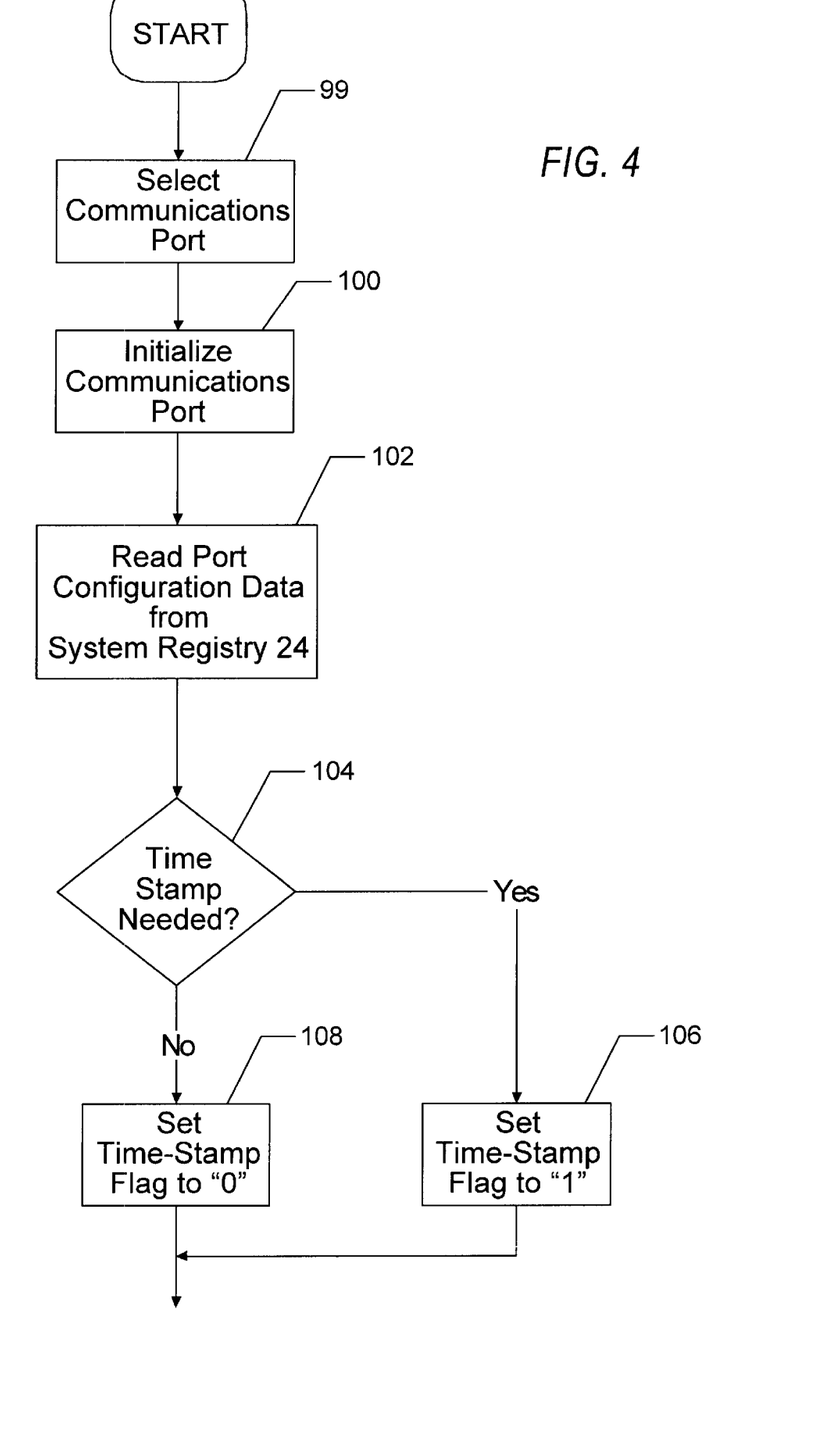
FIG. 4 is a flow chart depicting the logic flow of preparing the communications port to receive a character in accordance with the present invention.

Now referring to FIG. 4, a flowchart depicting the logic flow of configuring a selected serial communications port is illustrated therein. First, the software application or the user (not shown) selects a proper serial communications port. The port identifier designates to the port driver VxD which port has been selected. Upon initialization, the port driver VxD will read the configuration data of the initialized port including the time-stamp value from the system registry. The port driver VxD includes a time-stamp flag, a variable that indicates whether time-stamping is appropriate in accordance with the present invention.

If the time-stamp value in the system registry is 1, the time-stamp flag of the port driver VxD will be set to 1 to indicate a time-stamp will be attached to each character received. Otherwise, the time-stamp flag will be set to zero to indicate that a time-stamp will not be attached to each character received to allow the selected port to function normally.

The present invention significantly reduces timing-induced data stream errors inherent in conventional protected operating system-based serial communications.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

General Description of Asynchronous Serial Communication

Figure 2:
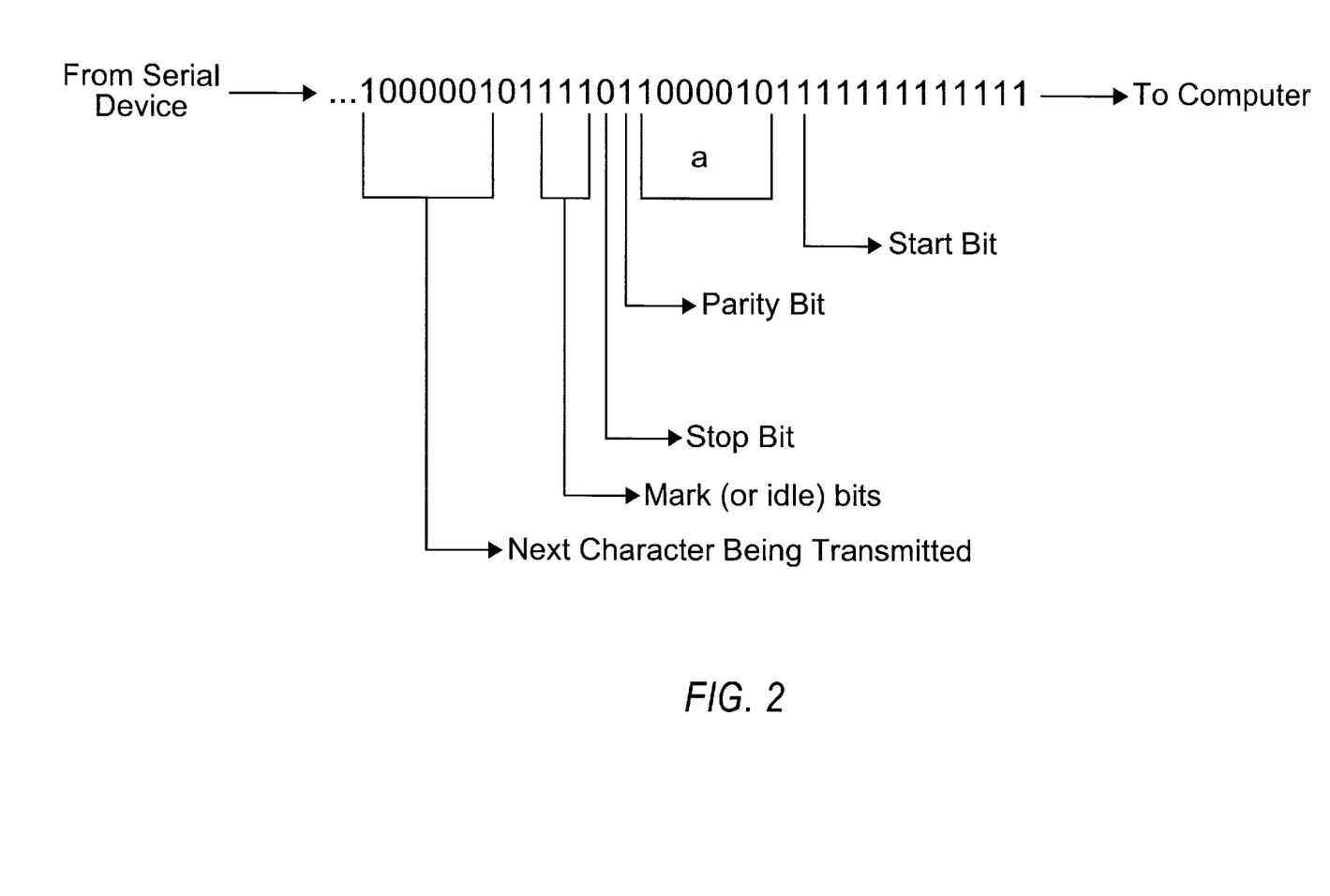
FIG. 2 is a graphical illustration of the conventional asynchronous transmission of the character "a"
Figure 3:
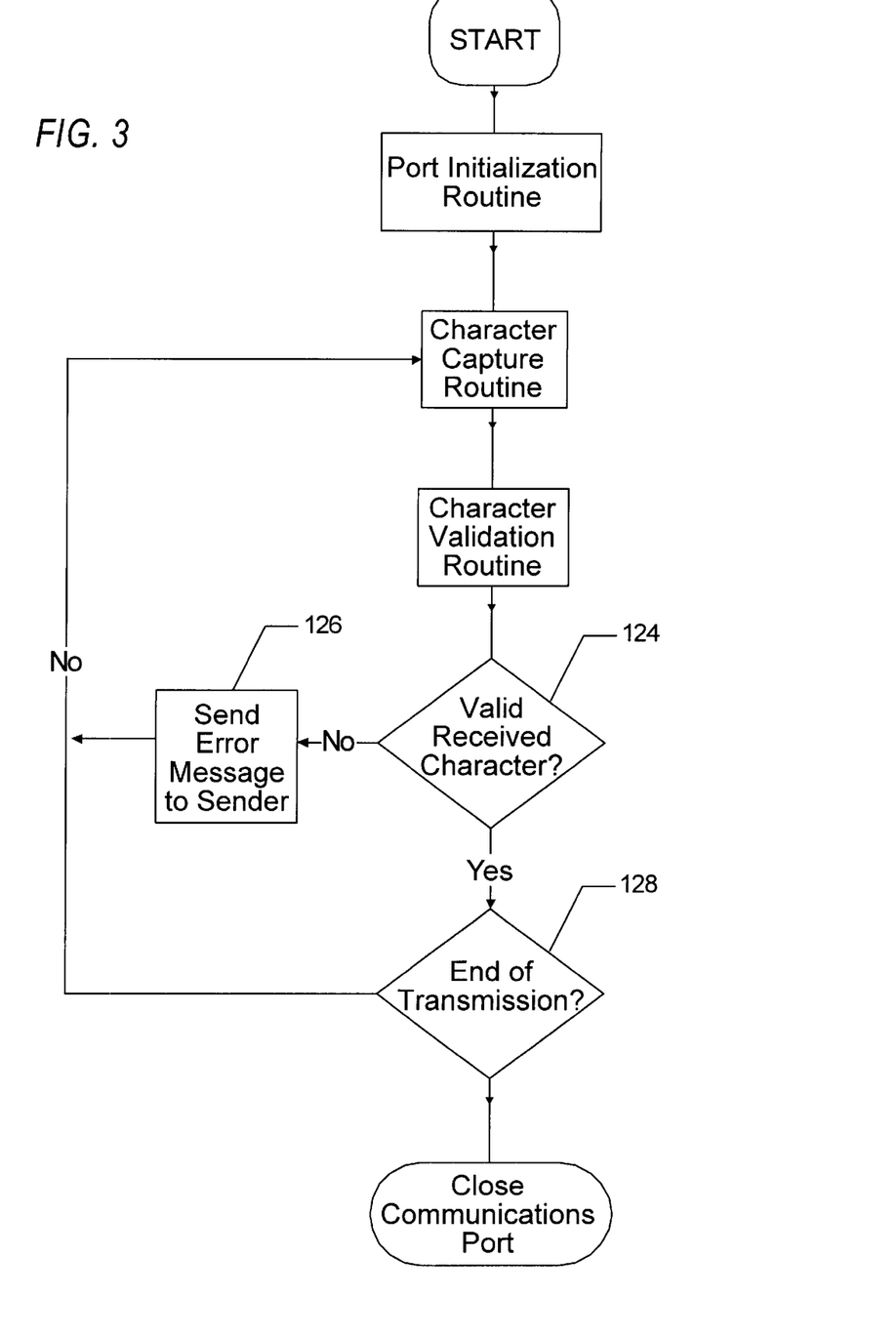
FIG. 3 is a flow chart depicting the logic flow of the prior art serial communication of a character of data through a serial communications link.

As shown generally in FIG. 1, serial ports are used to physically connect asynchronous devices, such as an automotive component 20, to a computer 18. Serial ports require only a single pin, or wire, to send a data character to the automotive component 20. To accomplish this, the data is converted from a parallel form (sent by the computer), to a sequential form, where bits are organized one after the other in a series, as illustrated in FIG. 2. The data is transmitted to the automotive component 20 with the least significant bit (or zero-bit) sent first. Once received by the automotive component 20, the data is converted back into parallel form.

Serial transmissions of a single character are simple and straightforward. However, complications arise when a large number of characters are transmitted in series as shown in FIG. 2. The receiving system does not know where one character ends and the other begins. To solve this problem, both ends of the communication link must be synchronized or timed. Asynchronous communication is the process where transmitted data is encoded with start and stop bits, specifying the beginning and end of each character. The Start Bit is used to alert the receiver that a word of data is about to be sent, and to force the clock in the receiver into synchronization with the clock in the transmitter.

After the Start Bit, the individual bits of the word of data are sent. Each bit in the transmission is transmitted for exactly the same amount of time as all of the other bits, and the receiver "looks" at the wire at approximately halfway through the period assigned to each bit to determine if the bit is a "1" or a "0". For example, if it takes two seconds to send each bit, then it will wait two seconds and then examine the value of the next bit, and so on.

The sender does not know when the receiver has "looked" at the value of the bit. The sender only knows when the clock says to begin transmitting the next bit of the word. When the entire data word has been sent, the transmitter may add a Parity Bit that the transmitter generates. The Parity Bit may be used by the receiver to perform simple error checking. Finally, the transmitter sends at least one Stop Bit.

These additional bits provide timing or synchronization for the connection by indicating when a complete character has been sent or received; thus, timing for each character begins with the start bit and ends with the stop bit.

Asynchronous communication allows data to be transmitted without the sender having to send a clock signal to the receiver. Instead, the sender and receiver must agree on timing parameters in advance and special bits are added to each word which are used to synchronize the sending and receiving units. These timing parameters include a fixed data-transfer rate known as the baud rate. The baud rate is the number of bits transferred per second. The transmitter and receiver each generate a signal at the selected baud rate based on their respective internal system clocks. The baud rate of the transmitter and receiver can differ by about 3.0% with a maximum variance of about 5.0%.

Description of A Protected Operating System Architecture

Now referring to FIG. 1 in more detail, a protected operating system 10 (OS), such as the Windows® operating system, is illustrated therein. One of the features of a protected OS 10 is that a given program lives in a particular level of protection, or privilege. The microprocessor defines the number of privilege levels and the differences between them, and they are ranked from least privileged to most privileged.

Early processors, like the 8086 (running mainly DOS applications), only had one privilege level. Most modern processors allow two levels, typically called supervisor mode and user mode. The 80×86 and more recent models of computer processors, however, allow four privilege levels, or "rings" as recited by Intel. Ring 0 is the most privileged and Ring 3 is the least privileged. The protected operating system 10 assigns Ring 0 to supervisor mode and Ring 3 to user mode. Ring 2 (not shown) is used as a sort of "privileged user mode" and can typically be treated as if it were Ring 3 for purposes of the present invention. Ring 1 (not shown) is not used by the protected operating system 10.

Therefore, a particular piece of software code runs in either Ring 0 or Ring 3. For example, most virtual device drivers (VxDs), such as port driver VxD 14 run in Ring 0, and all software applications 12 run in Ring 3. The rules for program execution vary greatly between the two rings. The primary difference between the two rings is the type of instructions that code in a particular ring is allowed to execute. This is why these rings are also called "privilege levels"—code running in Ring 0 is more privileged than code in Ring 3, and can therefore execute more types of instructions. For example, Ring 0 code, which usually exists in the form of a virtual device driver (VxD), can perform I/O instructions, can receive hardware interrupts 26, and can obtain access to all of the system memory.

Description of Hardware Interrupts

All Industry Standard Architecture ("ISA", e.g. IBM PC/AT and compatible) computer systems generate a hardware interrupt 26 on interrupt-request zero (IRQ0) 18.2 Hz at the Ring-0 level. An interrupt is an asynchronous event that suspends normal processing and temporarily diverts the flow of control through an "interrupt handler" routine. Interrupts may be caused by both hardware (I/O, timer, machine clock) and software (supervisor, system call or trap instruction).

Hardware interrupt 26 is mapped to interrupt 8 (INT 8) and can be intercepted by any software application 12 that wants to hook to it. At 18.2 Hz (Hz=1 cycle/second), the hardware interrupt 26 occurs approximately once every 55 milliseconds (1 millisecond=$10^{-3}$ seconds or $10^3$ microseconds; 18.2 Hz=$(18.2)^{-1}$ seconds=55×$10^{-3}$ seconds). The standard Windows® operating system serial communications driver (serial.vxd), for example, hooks INT 8 and maintains the value returned by the GetTickCount function. The GetTickCount API returns the number of milliseconds since the Windows® operating system was started. The accuracy of this API, however, is only 55 ms, as it is updated 18.2 times each second, 18.2 Hz (just like the real mode system clock). Therefore, it should be used only for very rough measurements.

Many applications require a finer timing accuracy than 55 ms. Often, the 55 ms timing accuracy creates timing induced data stream errors. The Society of Automotive Engineers (SAE), for example, has developed at least two standards (J1587 and J1708) to regulate the timing accuracy of serial communications between computers 18 and automotive components 20. The two J1587 and J1708 standards require a 1 ms timing accuracy. The timing resolution from the application level (Ring-3) of conventional protected operating systems, such as the Windows® system, cannot meet the timing accuracy requirement of SAE standards.

The present invention achieves the desired timing accuracy by adding a time-stamp for each character received and placed in the receive queue 21 at ring-zero level.

Virtual Timer Driver (VTD) is a real-time clock 22 that indicates the time protected operating system 10 has been running based on a 1.196 MHz (1 MHz=$10^6$ Hz) clock. This value is obtained by calling VTD with AX set to 0100 h. The time value is returned in EDX:EAX. The returned time value is accurate to 0.8 microseconds (1 microsecond=$10^{-6}$ seconds or $10^{-3}$ milliseconds; (1.196 MHz)$^{-1}$=0.8×$10^{-6}$ seconds).

"VTD-Get-Real-Time( )" (not shown) is called to get a high accurate time-stamp and this time-stamp is attached to each character received inside the hardware interrupt handler at Ring-0. In addition to one byte real data, the read thread also reads an eight-byte time-stamp for each real character. It should be understood, however, that any real-time clock that has a timing accuracy equivalent to VTD-Get-Real-Time( ), e.g. approximately 0.8 microseconds, can be substituted for the VTD-Get-Real-Time service.

Description of SAE Standards

The Truck and Bus Data Format Diagnostics Subcommittee of the Engineering Society For Advancing Mobility Land Sea Air and Space International (SAE) has promulgated standards regarding the format of electronic signals and information transmitted among Truck and Bus electronic components. The standards define the format of messages and data that is of general value to modules on the data communications link. Included are field descriptions, size, scale, internal data representation, and position within a message. The standards further include guidelines for the frequency of and circumstances in which messages are transmitted.

The purpose of the standards is to define the format of messages and data being communicated between microprocessors used in heavy-duty vehicle applications. In particular, the SAE has devised standards to be used with SAE J1708 and J1587.

A copy of the SAE Surface Vehicle Recommended Practice (SAE 1587) can be obtained from The Engineering Society For Advancing Mobility Land Sea Air and Space International, 400 Commonwealth Drive, Warrendale, Pa. 15096-0001.

Moreover, the SAE defines a recommended practice for implementing a bi-directional, serial communications link among modules containing microcomputers. It also defines those parameters of the serial link that relate primarily to hardware and basic software compatibility such as interface requirements, system protocol, and message format.

Bit Time, as defined by the SAE, is the duration or period it takes one unit of information to cross the communications link. The SAE mandates that the "bit time shall be 104.17 $\mu s \pm 0.5\%$ (±500 ns). This is equivalent to a baud rate of 9600 bits per second." Moreover, the SAE further requires a CHECKSUM variable included in the data transmitted. Simple message error detection may be implemented by adding the checksum to the sum of all previous message characters. The 8 bit sum will be zero, neglecting the CARRY, for a correctly received message.

The CHECKSUM variable, however, is not a reliable means of validating the character received. Often, the CHECKSUM variable will indicate that the received data is valid, but the characters are incorrectly ordered. The incorrect order of the characters cannot be properly determined by the conventional CHECKSUM validation method alone. The time-stamping validation procedure of the present invention overcomes this deficiency in conventional validation methods. It should be understood, however, that for those communications ports that do not require the finer timing accuracy that is provided by the present invention, the checksum validation process may be appropriate.

A copy of the SAE Surface Vehicle Recommended Practice (SAE 1708) can also be obtained from The Engineering Society For Advancing Mobility Land Sea Air and Space International, 400 Commonwealth Drive, Warrendale, Pa. 15096-0001.

Description of the Preferred Embodiment

Now referring to FIGS. 3, 4, 5 and 6, a software application 12 or the user (not shown) selects a valid serial communications port (step 99). The present invention initializes the selected communications port (step 100). As described above, the port driver VxD 14 may be connected to several serial communications ports simultaneously. In the preferred embodiment of the present invention, however, port driver VxD 14 is used to control communications between a computer 18 and an automotive component 20.

The port driver VxD 14 reads the system registry 24 to determine the configuration of the selected communications port (step 102). The system registry 24 is a single place for keeping such information as what hardware is attached, what system options have been selected, how computer memory is set up and what application programs are to be present when the operating system is started. Here, the port driver VxD 14 must determine whether or not the selected communications port will need to implement the time-stamping function of the present invention (step 104). It should be understood that the fine timing accuracy provided by the present invention might not be necessary for all applications. If fine timing accuracy is not required for a particular application, then the time stamping function of the present invention may not be necessary.

The configuration data stored in the system registry 24 will indicate whether or not the selected port requires fine timing accuracy and, therefore, a time-stamp. For example, in accordance with the SAE J1587 and J1708 standards for serial data communications, all ports connected to an automotive component 20 which adhere to the SAE standards (i.e. J1587 networks) will require time-stamping. It should be understood, however, that the present invention might be implemented with any communications network that requires real-time timing accuracy in a protected operating system environment.

Preferably, a time stamp value is stored in the system registry 24 and indicates whether or not the selected communications port requires a time stamp added to each character received through it. If the time stamp value in the system registry 24 indicates that the selected port requires time-stamping, then the port driver VxD 14 sets its time-stamp flag equal to "1" (step 106). If, however, the selected port does not require time-stamping to function normally, then the port driver VxD 14 assigns the time-stamp flag a value of "0" (step 108).

Figure 5:
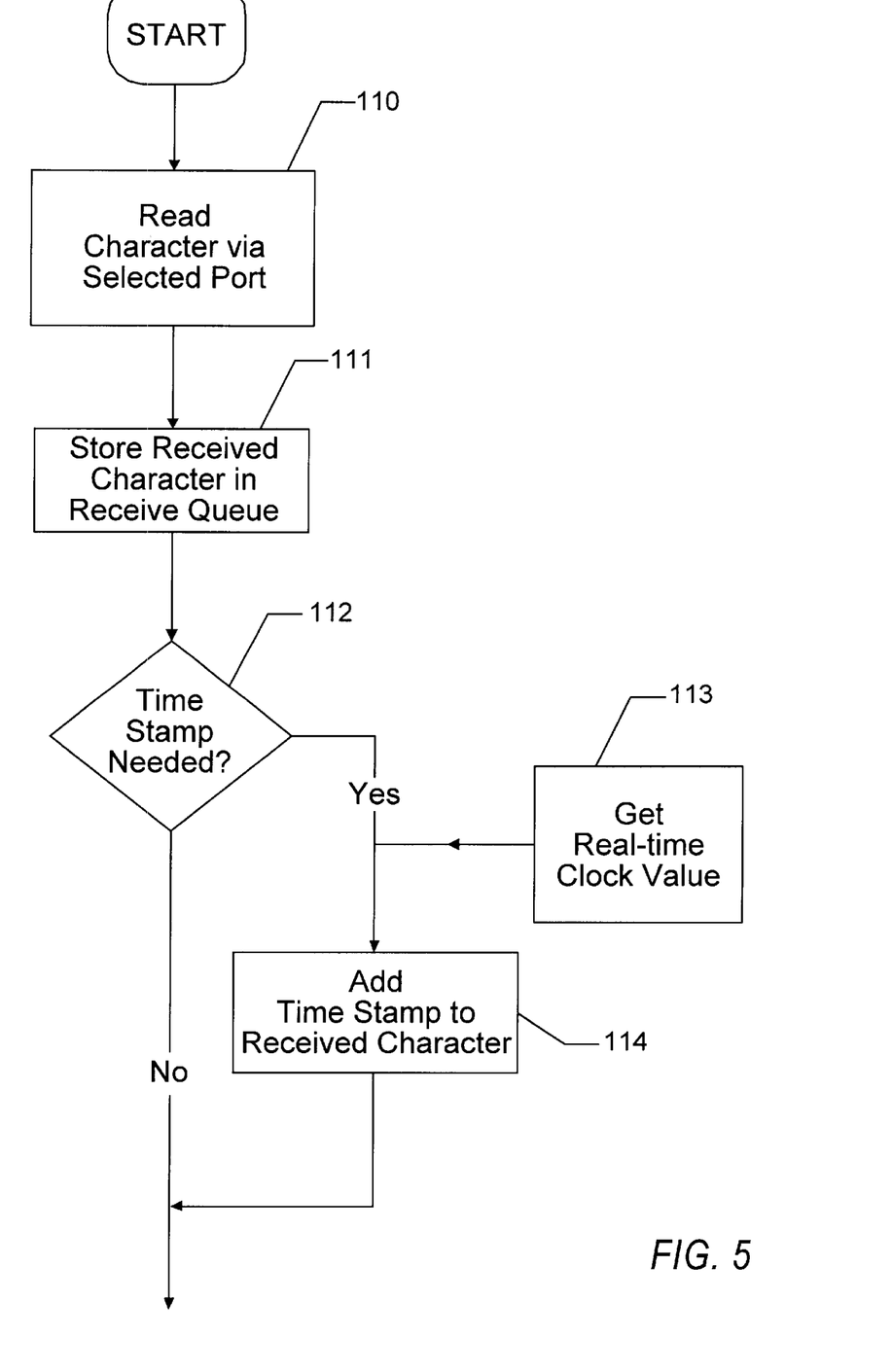
FIG. 5 is a flow chart depicting the logic flow of retrieving a character across the communications link and attaching a time-stamp to the received character in accordance with the present invention.

Now referring to FIG. 5, once the selected port is initialized and the time stamp flag is set, the port driver VxD 14 reads a character from the selected port (step 110) and temporarily stores the received character in a receive queue 21 in computer 18's memory at Ring-0 level to await processing (step 111). Once the character is read and stored in the receive queue 21, the port driver VxD 14 checks the time-stamp flag to determine whether the currently received character requires a time-stamp (step 112). If the time-stamp flag indicates that a time-stamp is required for the received character, the VTD-Get-Real-Time function is called (step 113) and a time-stamp value is assigned to the received character in the receive queue 21 (step 114). Preferably, the time-stamp value is added to the received character in the receive queue 21 in computer 18's memory at Ring-0 level.

Figure 6:
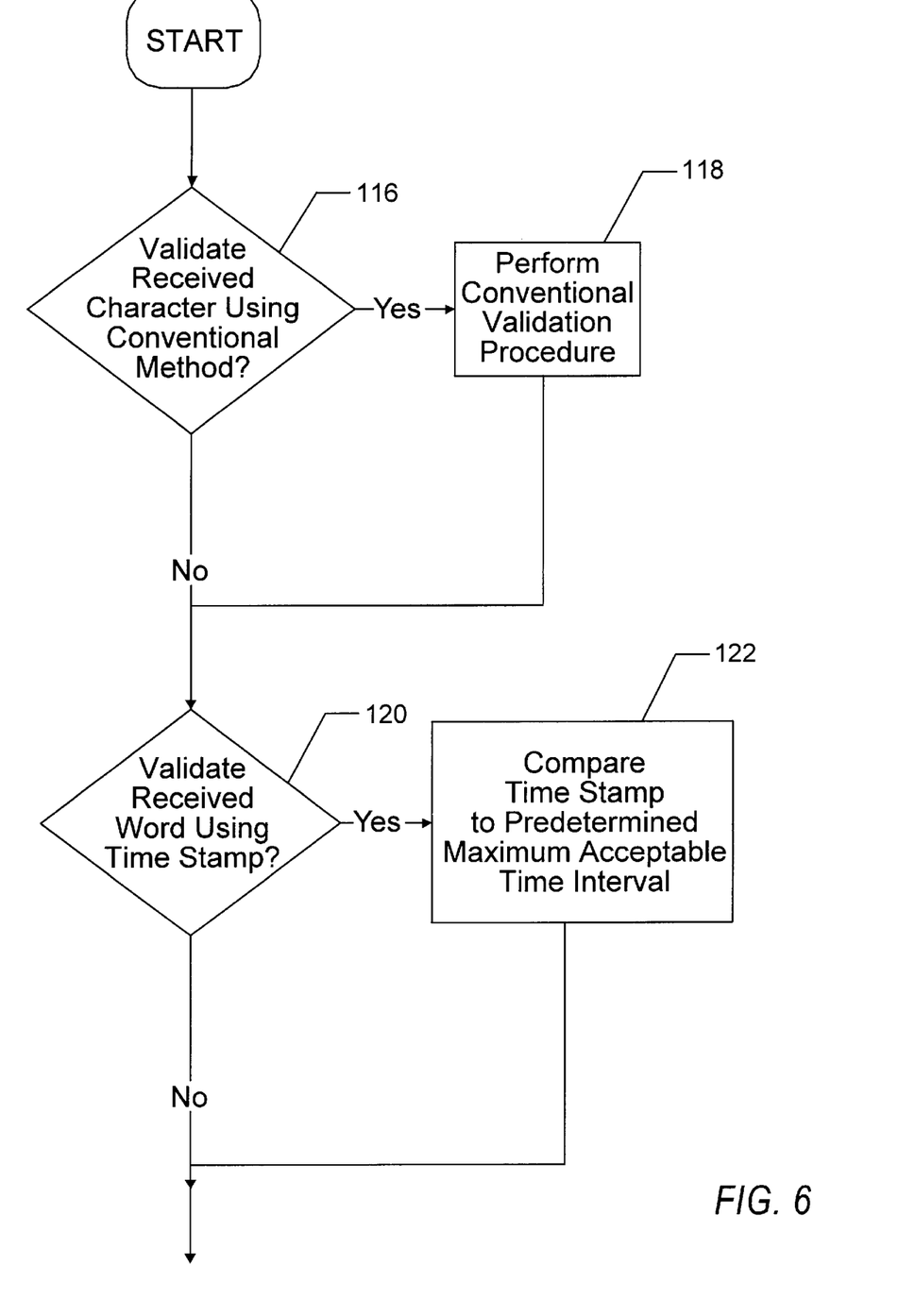
FIG. 6 is a flow chart depicting the logic flow of validating the received characters in accordance with the present invention.

Now referring to FIG. 6, if no time-stamp is required for the received character, then the port driver VxD stores the received character in the receive queue 21 and proceeds to validate the received character. At this point, the port driver VxD 14 makes at least three validation options for validating the received character available to the user or the software application 12: (1) validation using conventional validation methods (steps 116 and 188), (2) validation using the time-stamp value comparison methods (steps 120 and 122), or (3) validation using both methods (Steps 116–122).

The conventional validation method might include comparing a received word (or group of characters) to a predetermined checksum value. The checksum value is conventionally compared to the sum of the total number of characters actually received to determine if the correct number of characters were received. As described above, however, the checksum validation method cannot be used to determine whether the individual characters of a transmitted word were received in the proper order.

If the time stamp flag indicates that there is a time stamp included with the received character, the time-stamp value is preferably compared to a maximum acceptable time interval indicating the acceptable time-interval for receiving a specific type of character (step 122). If the time-stamp value is larger than the acceptable time interval, then a possible error occurred in the transmission of the character, the character is most likely invalid, and the sender should be alerted. It should be understood that the maximum acceptable time interval between received characters depends on the particular application of the present invention. Preferably, the time between characters in a message is less than 208 microseconds.

If the time stamp exceeds the maximum acceptable time interval or the conventional validation method determines that the received character or word is invalid, then an error message is sent to the sender indicating that the last received character or word was not received properly and the port driver VxD 14 sends a request to resubmit that character or word (step 126). The port driver VxD 14 then reiterates the above described routine for retrieving the new character transmitted by the sender and follows the procedure for processing a received character indicated above (steps 110–124).

Finally, if it is determined in either scenario that a valid character was received as embedded within a packet (step 124), the port driver VxD 14 checks to see if the end of the transmission has been reached (step 128). If the sender is still sending characters across the communications link, then the port driver VxD 14 continues to process those received characters (steps 110–124). If, however, there are truly no more characters to receive from the sender, the port driver VxD 14 closes the selected communications port and frees up that utility for use by another application.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A virtual device driver for processing serial communication data in a computer having protected operating system consisting of high and low privilege levels, the device driver comprising:

a port identifier for identifying at least one communications port adapted to be connected to said computer;

a time stamp flag for determining a time-stamp status for said at least one communications port;

a character reader for reading at least one character via said at least one communications port;

a receive queue for storing at least one received character at said high privilege level;

a real-time clock for adding a time-stamp value to said at least one received character within said high privilege level;

a predetermined maximum acceptable time interval for at least one character; and a validation module for determining the validity of said at least one received character.

2. The virtual device driver of claim 1, wherein said time-stamp flag is stored in a system registry of said computer.

3. The virtual device driver of claim 1, wherein said validation module compares said time-stamp value to said predetermined maximum acceptable time interval to determine if said received character is valid.

4. The virtual device driver of claim 1, wherein said real-time clock has a timing accuracy equal to one divided by the frequency of clock ticks, equivalent to at least 0.8 microseconds.

5. The virtual device driver of claim 1, wherein said at least one communications port is connected to an automotive component.

6. The virtual device driver of claim 1, wherein said low privilege level is Ring-3 and said high privilege level is Ring-0.

7. A method of processing serial communication data in a protected operating system of a computer having high and low privilege levels, the method comprising the steps of:

identifying at least one communications port of said computer;

determining a time-stamp status for said at least one communications port;

reading at least one character via said at least one communications port;

storing at least one received character;

adding a time-stamp value to said at least one received character at said high privilege level; and comparing said time-stamp value to a predetermined standard character transmission time to determine if said received character is valid.

8. The method of claim 7, wherein said time-stamp status is determined by a time-stamp flag stored in a memory location in said computer.

9. The method of claim 7, wherein said real-time clock has a timing accuracy of one divided by the frequency of clock ticks equal to 0.8 microseconds.

10. The method of claim 7, wherein said at least one communications port is connected to an automotive component.

11. The method of claim 7, wherein said low privilege level is Ring-3 and said high privilege level is Ring-0.

12. A virtual device driver for processing serial communication data in a computer having protected operating system consisting of high and low privilege levels, the device driver comprising:

a port identifier for identifying at least one communications port adapted to be connected to said computer; wherein said at least one communications port is also connected to an automotive component;

a time stamp flag for determining a time-stamp status for said at least one communications port;

a character reader for reading at least one character via said at least one communications port;

a receive queue for storing at least one received character at said high privilege level;

a real-time clock for adding a time-stamp value to said at least one received character within said high privilege level;

a predetermined maximum acceptable time interval for at least one character; and a validation module for determining the validity of said at least one received character.

13. The virtual device driver of claim 12, wherein said time-stamp flag is stored in a system registry of said computer.

14. The virtual device driver of claim 12, wherein said validation module compares said time-stamp value to said predetermined maximum acceptable time intervals to determine if said received character is valid.

15. The virtual device driver of claim 12, wherein said real-time clock has a timing accuracy equal to one divided by the frequency of clock ticks, equivalent to at least 0.8 microseconds.

16. The virtual device driver of claim 12, wherein said low privilege level is Ring-3 and said high privilege level is Ring-0.

* * * * *